United States Patent [19]

Hubble, III et al.

[11] Patent Number: 5,339,150
[45] Date of Patent: Aug. 16, 1994

[54] MARK DETECTION CIRCUIT FOR AN ELECTROGRAPHIC PRINTING MACHINE

[75] Inventors: Fred F. Hubble, III; James P. Martin; Jeffrey J. Folkins, all of Rochester, N.Y.

[73] Assignee: Xerox Corporation, Stamford, Conn.

[21] Appl. No.: 35,830

[22] Filed: Mar. 23, 1993

[51] Int. Cl.$^5$ ............................................. G03G 15/01
[52] U.S. Cl. ........................... 355/326 R; 346/107 R; 355/212
[58] Field of Search ................. 355/208, 48, 212, 317, 355/326, 327, 328; 358/68-69; 346/107 R, 108, 157, 160

[56] References Cited

U.S. PATENT DOCUMENTS

| | | | |
|---|---|---|---|
| Re. 32,967 | 6/1989 | St. John et al. | 242/57.1 |
| 4,660,059 | 4/1987 | O'Brien | 346/157 |
| 4,833,503 | 5/1989 | Snelling | 355/259 |
| 4,912,491 | 3/1990 | Hoshino et al. | 346/160 |
| 4,983,854 | 1/1991 | Mizuno et al. | 250/561 |
| 5,072,244 | 12/1991 | Aoki et al. | 346/160 |
| 5,076,163 | 12/1991 | Sainio | 101/181 |
| 5,208,796 | 5/1993 | Wong et al. | 369/97 |
| 5,229,787 | 7/1993 | Rees et al. | 346/107 R |
| 5,258,830 | 11/1993 | Schmidt et al. | 358/60 |
| 5,260,725 | 11/1993 | Hammond | 346/157 |

Primary Examiner—A. T. Grimley
Assistant Examiner—T. A. Dang

[57] ABSTRACT

An apparatus and method of adjusting an imager in an electrophotographic printing machine to correct for registration errors when forming a composite image. Registration errors are sensed by forming one or more target lines on the photoreceptor surface, detecting the center of the lines and controlling the operation of the imager in response thereto. In one embodiment, four LED print bars form a composite color image in a single pass. A photosensor is placed beneath the print bars; a narrow target line is formed on the belt surface a few scan lines before the start of an exposure frame. The center of the line is detected by circuitry connected to the sensor output which produces a signal corresponding to detection of the center of the target line. This output signal is generated for each of the three downstream print bars and a signal is applied to each print bar to start the image exposure sequence in registration with first image exposure. In a second embodiment, skew registration adjustments are enabled by forming two line marks at opposite ends of the photoreceptor, detecting the center of each mark and making the adjustments of the position of the downstream print bars based on time differences between detection of the generation of the two signals.

13 Claims, 10 Drawing Sheets

FIG. 7

MARK DETECTION CIRCUIT FOR AN ELECTROGRAPHIC PRINTING MACHINE

BACKGROUND AND MATERIAL DISCLOSURE STATEMENT

The present invention relates generally to an image forming apparatus, and, more particularly, to an apparatus incorporating a photoreceptor belt having line indicia on the surface thereof whose location must be precisely detected for image registration purposes.

High speed copiers and digital printer machines typically employ a photoreceptor belt as the imaging media since the belt can provide significantly more area to form a plurality of latent images during a single pass or revolution when compared to a machine with a photoreceptor drum as the imaging surface. The position of the belt during operation must be known with a great deal of precision since the system timing control must ensure that the images are formed within preselected frames on the photoreceptor surface and exposure must be coordinated with the development, transfer and paper feeding functions. This is especially true for color printing machines. Positional errors occur because the belt is subject to changes in physical size and its rotational speed may vary because of mechanical wear and mechanical tolerances in the drive components. Various techniques have been developed in the prior art to compensate for these errors. These techniques include measurement of the movement of the belt in some fashion so that images are formed at the same relative location from revolution to revolution.

One technique uses holes formed in the belt at a predetermined distance outside of the image exposure frame. The passage of the holes through the viewing nip comprising a light source and a sensor generates an output signal which is used for registration purposes. Co-pending application, U.S. Ser. No. 07/807,927, filed Dec. 16, 1991, discloses this technique in a system using a Raster Output Scanner (ROS) as the imager. Co-pending application, U.S. Ser. No. 07/807,931, filed on Sep. 18, 1992, discloses the technique with LED print bars as the imager. Both of these applications are assigned to the same assignee as the present invention and are hereby incorporated by reference.

Formation of belt holes has disadvantages in that is reduces the structural integrity of the belt and requires an extra process step when forming the belt. One alternative method is to form registration marks on the surface of the belt, either at manufacture or by exposing the belt in a non-image area with a target mark and developing the mark with toner. The mark can then be sensed through the photoreceptor belt. The marker, rather than the hole, is then sensed. This technique requires a partially, light transmissive type of photoreceptor.

The following patents contain disclosure of techniques for sensing marks placed on the photoreceptor belt for various purposes.

U.S. Pat. No. 4,912,491 discloses an apparatus for forming superimposed images and registration marks corresponding to the position of the images associated therewith. The registration marks are formed apart from the imaging portion of the medium in a transparent area to be illuminated from the opposite side of the belt. Detectors sense the position of the registration marks as the marks pass between the illuminated areas. The sensing of the registration marks is used in determining proper registration positioning, whereby the image forming devices may be adjusted to achieve such registration.

U.S. Pat. No. 32,967 discloses a web tracking system for a continuous web which passes along a predetermined path through one or more processing stations. The tracking system has aligned tracking indicia on one or both sides of the web and detectors sense these indicia which are indicative of dimensional changes in width and length of the web at a particular point. An edge sensor is also provided to determine movement of the web.

Co-pending application, U.S. Ser. No. 07/930,642, filed Aug. 17, 1992, assigned to the same assignee as the present invention, discloses an apparatus and method of positional tracking of a moving photoconductive belt and adjusting an imager in an electrophotographic printing machine to correct for alignment errors when forming a composite image. Registration errors are sensed by developing an appropriate set of target marks, detecting the target marks, and controlling the position of the imager. The contents of this application are hereby incorporated by reference.

For these prior art, mark-detecting systems, a high precision of accuracy is needed when detecting the presence of the registration marks. This is particularly true for systems such as the referenced co-pending application where the composite color image registration requirements set forth therein (25 $\mu$) become even more stringent. The present goal of an accuracy to $\pm 5$ $\mu$ has heretofore proved unattainable. Prior art detection systems that have been disclosed have merely been developed to generate output signals indicating the presence of a mark without trying to determine the center of the mark. This is especially true when the mark takes the form of a solid line. It will be appreciated that if the center of the detected line mark could be determined with a high degree of accuracy, the output signal could then be used to produce a very accurate registration and control signal. By sensing the center of the line, errors arising from both uniform and non-uniform line width variations, photoreceptor transmissivity, xerographic developed mass, contamination state of the sensor, flux intensity variations of the light source and any other similar errors are to first order eliminated.

According to one aspect of the present invention, there is provided an improved detection circuit for detecting line marks on the surface of a photoreceptor belt. In one embodiment, detection circuitry is used in conjunction with a photosensor on one side of the belt which senses the mark by use of a light source on the other side of the belt. More particularly, the present invention relates to an electrophotographic printing machine which incorporates a photoreceptor belt which moves along a preselected path, imaging means for forming a plurality of registered color images on the surface of said belt, said color images formed in overlying registration to form a composite color image, means for forming at least one target on the surface of said belt, means for sensing said target and for generating an output signal representing detection of the center of said target, and means responsive to said output signal for maintaining the overlying registration of said color images.

BRIEF DESCRIPTION OF THE DRAWINGS

FIG. 7 shows the embodiment of FIG. 2 with an alternate configuration of the line mark.

DESCRIPTION OF THE INVENTION

Figure 1:
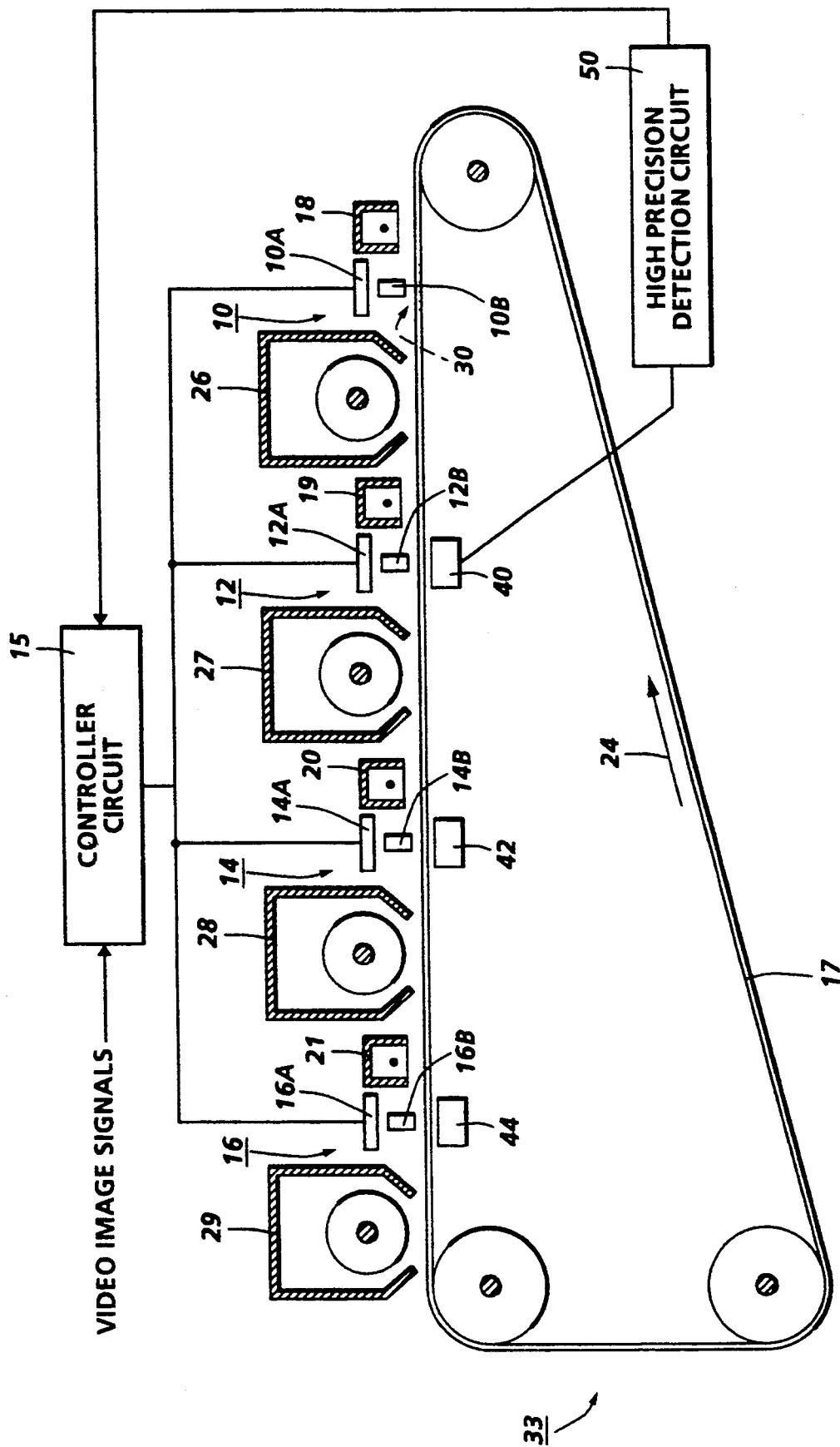
FIG. 1 is a side view of a single pass LED image bar printer incorporating the improved line mark detection circuitry of the present invention.

FIG. 1 shows a side view of a color xerographic system in which a plurality of imagers, for this embodiment, LED print bars, are positioned adjacent to a photoreceptor belt surface and selectively energized to create successive image exposures on a plurality of image frames. It is understood that other imagers may be used such as, for example, a gas discharge, or LCD shutter image bar, or a Raster Output Scanner. For full color, four print bars are used, one for each of the three basic colors and a fourth print bar for black images. For a full color system, each color image frame must be precisely aligned (registered) to previously formed images so that all corresponding pixels in each image area are registered. Current requirements are for registration tolerance of approximately $\pm 5\mu$ of photoreceptor motion quality in the process direction (direction of travel). This registration tolerance requirement is realized by incorporation of an improved detection circuitry according to the present invention as will be seen.

Figure 2:
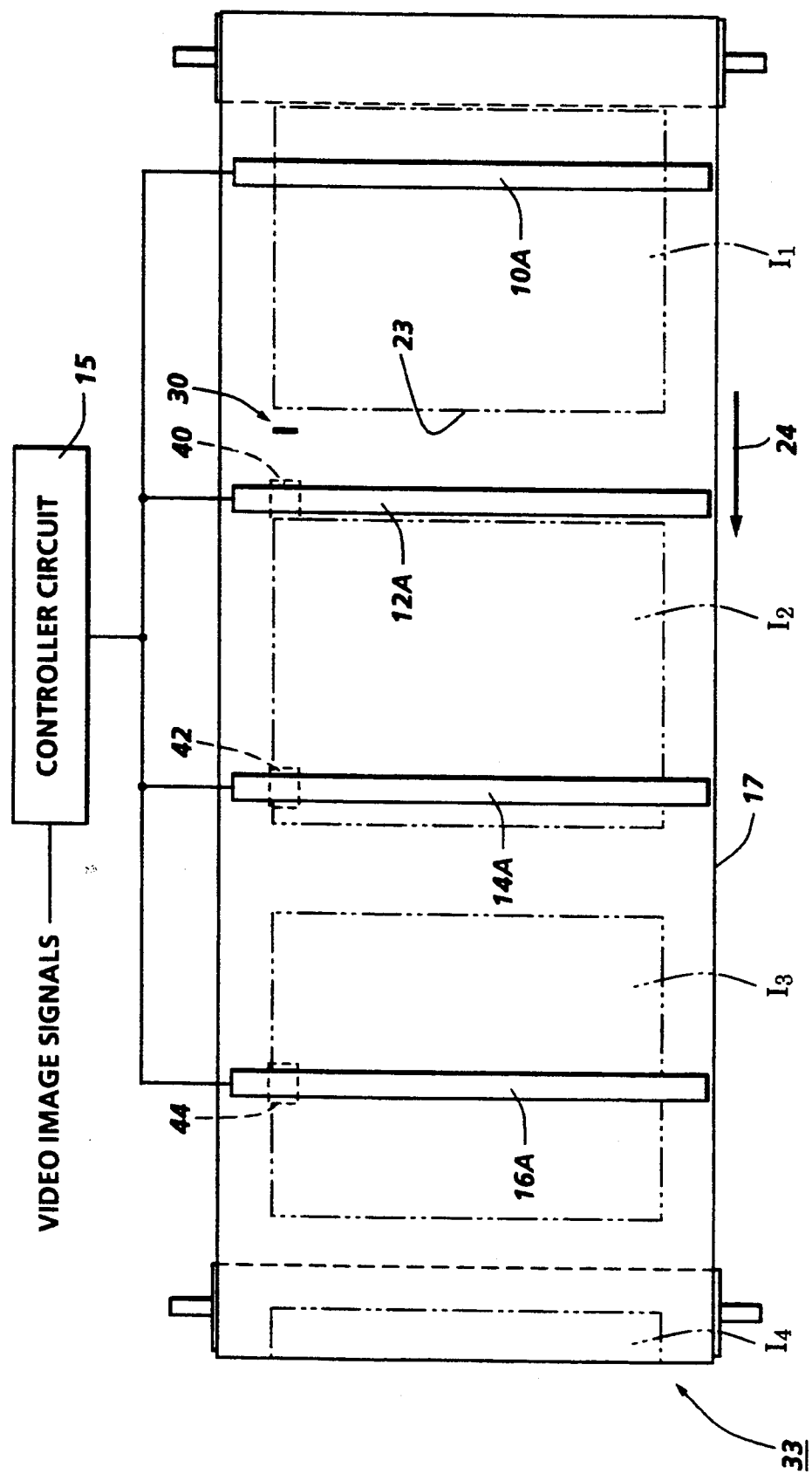
FIG. 2 is a top view of the printer of FIG. 1 omitting the xerographic stations excepting the exposure station.

FIG. 1 shows the printing system having four exposure stations 10, 12, 14, 16, each station including an LED print bar 10A, 12A, 14A, 16A. FIG. 2 shows a top view of the system of FIG. 1, absent some of the xerographic stations, for ease of description. Referring to FIGS. 1 and 2, each print bar is selectively addressed by video image signals processed through controller circuit 15, to produce a modulated output which is coupled through a gradient index lens array 10B, 12B, 14B, 16B, onto the surface of previously charged semi-transparent photoreceptor belt 17. The video image signals may be computer-generated color images or digital signals representing a document which has been scanned with a conventional color RIS scanner. Exposure stations 12, 14 and 16 also include sensor circuits 40, 42, 44, for purposes to be described below. The circumference of belt 17 is designed to accept an integral number of full page image frames; e.g. $I_1$-$I_4$, represented by dashed lines. Upstream of each exposure station are charge devices 18, 19, 20, 21, (FIG. 1) which place a predetermined electrical charge on the surface of belt 17. As the belt moves in the direction of arrow 24, each image frame moves past each of the print bars, with each bar providing its own exposure pattern, in response to the video image signal input. The exposure pattern begins when the leading edge of an image frame reaches a transverse start-of-exposure line, represented in image frame $I_1$ by a line 23. The exposure pattern is formed of a plurality of closely spaced transverse scan lines. Downstream from each exposure station, a development system 26, 27, 28, 29, develops a latent image of the last exposure without disturbing previously developed images. A fully developed color image is then transferred at transfer station 33, by means not shown, to an output sheet. Further details of the operation of xerographic stations in a multiple exposure single pass system are disclosed in U.S. Pat. Nos. 4,660,059 and 4,833,503, whose contents are hereby incorporated by reference.

With such a system as that disclosed in FIGS. 1 and 2, following the first image exposure, successive color images must be precisely aligned (registered) in the process and cross-process directions so that the start of exposure line for each frame is registered with previous start of exposure lines.

In order to obtain the $\pm 5\mu$ registration alignment, in a first embodiment, a target line 30 is formed by adding bit map data input to print bar 10A, via controller circuit 15, to expose a line image which is subsequently developed as target line 30 shown in FIG. 2. This line is formed in a non-image, interdocument area which precedes the leading edge (line of exposure 23) of image frame $I_1$ by several scan lines. The line, which has a nominal width of 25 to $150\mu$ or 1 to 3 pixels, depending on the application, will be detected for registration purposes as will be described below. It is understood that a plurality of line marks, one preceding each image frame, can be formed in like fashion and used in the same manner described below for line mark 30.

In a description of formation of a full color image; initially, a portion of belt 17 passes the charging station 18 which places the required charge on the surface of belt 10. As the belt advances into imaging station 10, the uniformly charged, photoconductive surface is exposed by print bar 10A which causes the charged portion of the belt to be discharged, first to form a latent image of the line mark and then a first black image, the image formed by creating a series of horizontal lines, each line having a certain number of pixels per inch at development station 26. At development station 26, a magnetic brush system advances the appropriate color development material, magenta, cyan, yellow or black, into contact with the latent electrostatic image. This first developed latent image and the developed target line 30 continue to advance in the direction of arrow 24.

Figure 3A:
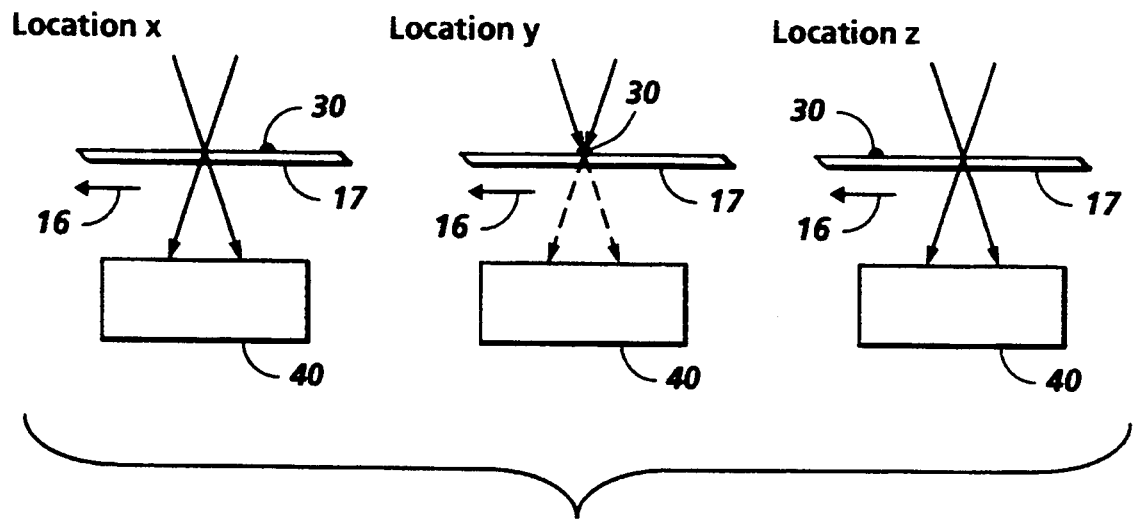
FIG. 3A shows the line mark on the photoreceptor belt as it passes through three locations with respect to the detection circuitry.
Figure 3B:
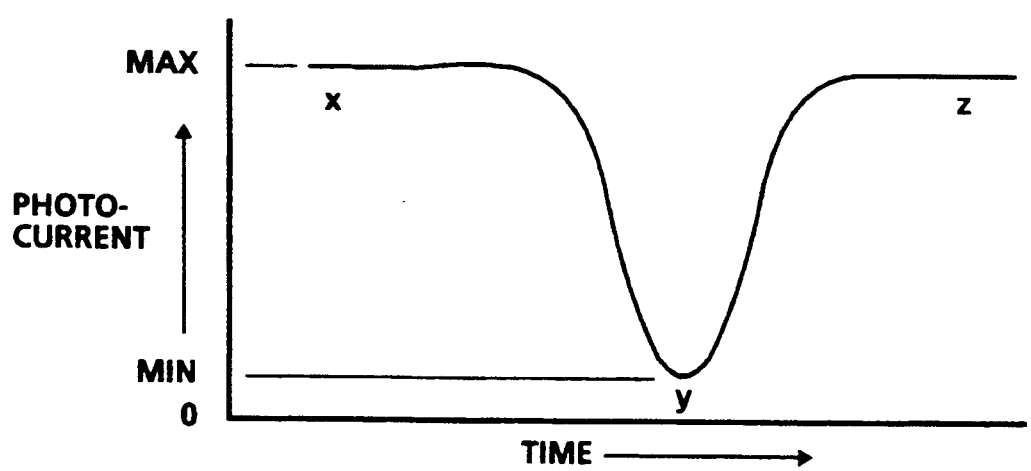
FIG. 3B shows the sensor output waveform for each of the three locations shown in FIG. 3A.

Charge station 19 recharges the photoconductive surface of belt 17, including the first developed frame. At second imaging station 12, a portion of print bar 12A is energized to provide a light output used to detect the passage of line mark 30. Sensor 40 is located in a fixed position, relative to the underside of belt 17. The lighted portion of bar 12A faces sensor 40. Sensor 40, in a preferred embodiment, is a small PIN photodiode with an active sensing width of approximately 3 mm, which is sensitive to the wavelength of print bar 12A. The spacing between bar 12A and sensor 40 is equal to the nominal focal length between bar 12A and the belt 17 surface plus the distance which sensor 40 is positioned beneath the belt surface (typically 1-5 mm). The arrival of mark 30 is detected by turning on the print bar 12A to a level such that light can be detected by sensor 40 through the semi-transparent belt 17 for a window of time when the timing mark line is expected. The signal produced from sensor 40 is dependent on the light output level from print bar 12A, the transmission of belt 17 and the sensitivity of sensor 40. The output of sensor 40 is sent to a high precision detector circuit 50 (FIGS. 1 and 4) where the sensor 40 output is shaped into a narrow defined pulse representing the detection of the center of mark 40. Referring to FIG. 3A, line 30 is shown, in side view, at location X approaching the viewing nip formed by the output of bar 12A and sensor 40. FIG. 3B shows a plot of the induced current in sensor 40 plotted against time and corresponding to the locations shown in FIG. 3A. Thus, at location X, the current level is at a maximum. As the belt advances line mark 30 into location Y, the flux from bar 12A is attenuated. Dynamically, this results in a brief dip in the current as shown in FIG. 3B. This current is a function of the mark 30 toner position relative to the print bar 12A imaging zone. The center of optical mass of line 30 is located at point Y, which is where the write signal for the second color image exposure bar 12A will be produced. As the belt advances to location Z, the current rises again to maximum level.

Figure 4:
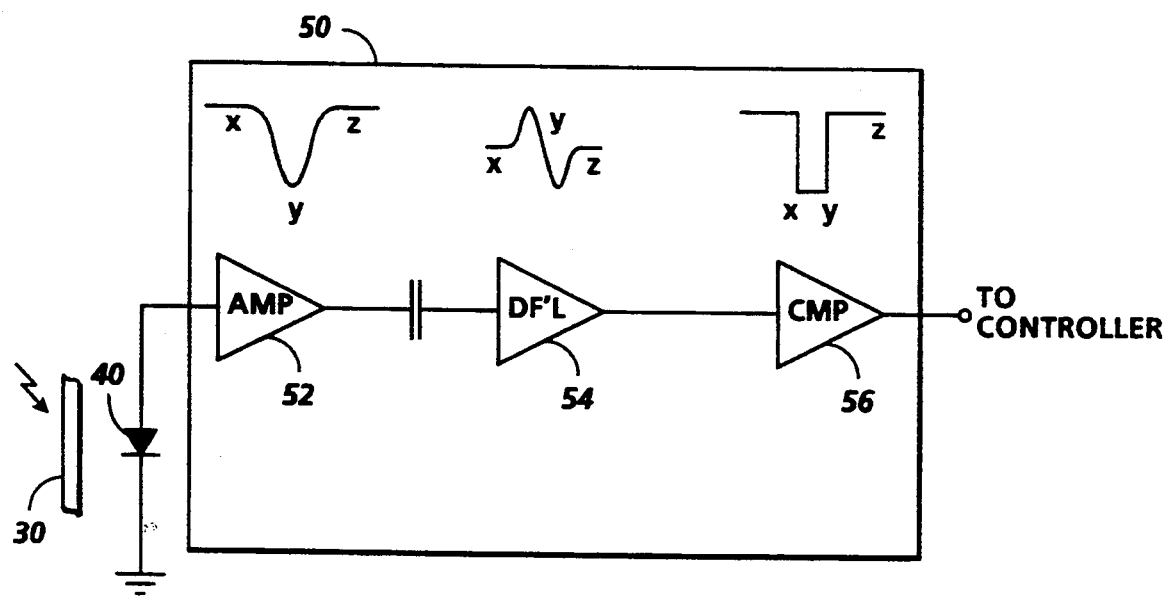
FIG. 4 is a schematic block diagram of the detection circuitry.
Figure 5:
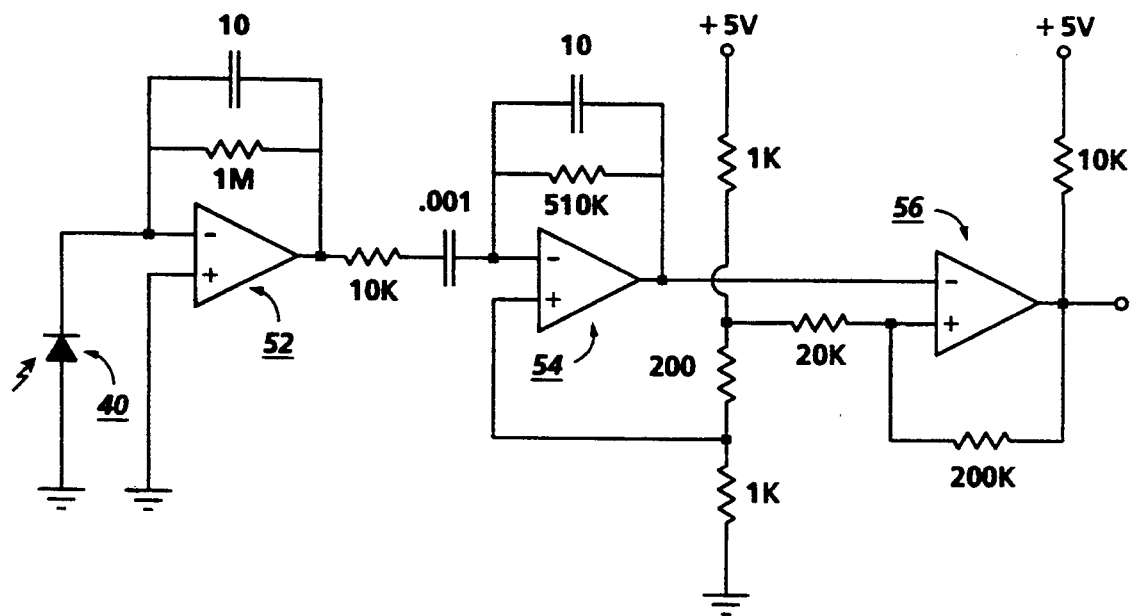
FIG. 5 is a detailed schematic diagram of the diagram shown in FIG. 4.

FIG. 4 is a block diagram of the detection circuit 50 with the waveforms produced at each stage. FIG. 5 is a more detailed schematic with voltage levels and additional related circuitry. The photocurrent output of sensor 40 is fed into a transconductance amplifier 52 which produces a voltage whose amplitude is proportional to the magnitude of the induced flux from bar 12A. When the flux is briefly attenuated by arrival of the mark 30, an inverted Gaussian-like waveshape results. The output is capacitively coupled to an inverting differential stage 54 whose output is sent to a hysteresised comparator 56. Comparator 56 is biased a few hundred mv above zero to prevent being triggered by noise from the differential stage. Once the differential signal exceeds this threshold, the comparator changes state, and, through a resistor feedback network, the threshold is reset to zero. Thus, when the differential signal passes through zero at the minimum of the photodetector pulse, the comparator resets to its original state, thereby producing a trigger signal precisely at the center of the detected mark. This signal is then sent to controller 15 to provide a very accurate start write signal for operation of the print bar 12A; e.g. the formation of the start of exposure line for the frame. Tests described below have determined that the circuit of FIGS. 4 and 5 sense the center of a 2-3 pixel wide line mark to within a ±1.5μ resolution, or well below the 5μ resolution requirement.

As the belt continues to move through the subsequent image stations, the same process is repeated; the image is developed, recharged and mark 30 detected at stations 14 and 16 and used to control the write operation of print bars 14A, 16A, respectively, to form the last two color images. The preferred color sequence is black, yellow, magenta and cyan, but it should be evident to one skilled in the art that the color of the toner at each development station could be different. If a color other than black is used at station 10, the sensitivity of sensor 40 would be changed accordingly.

Figure 6:
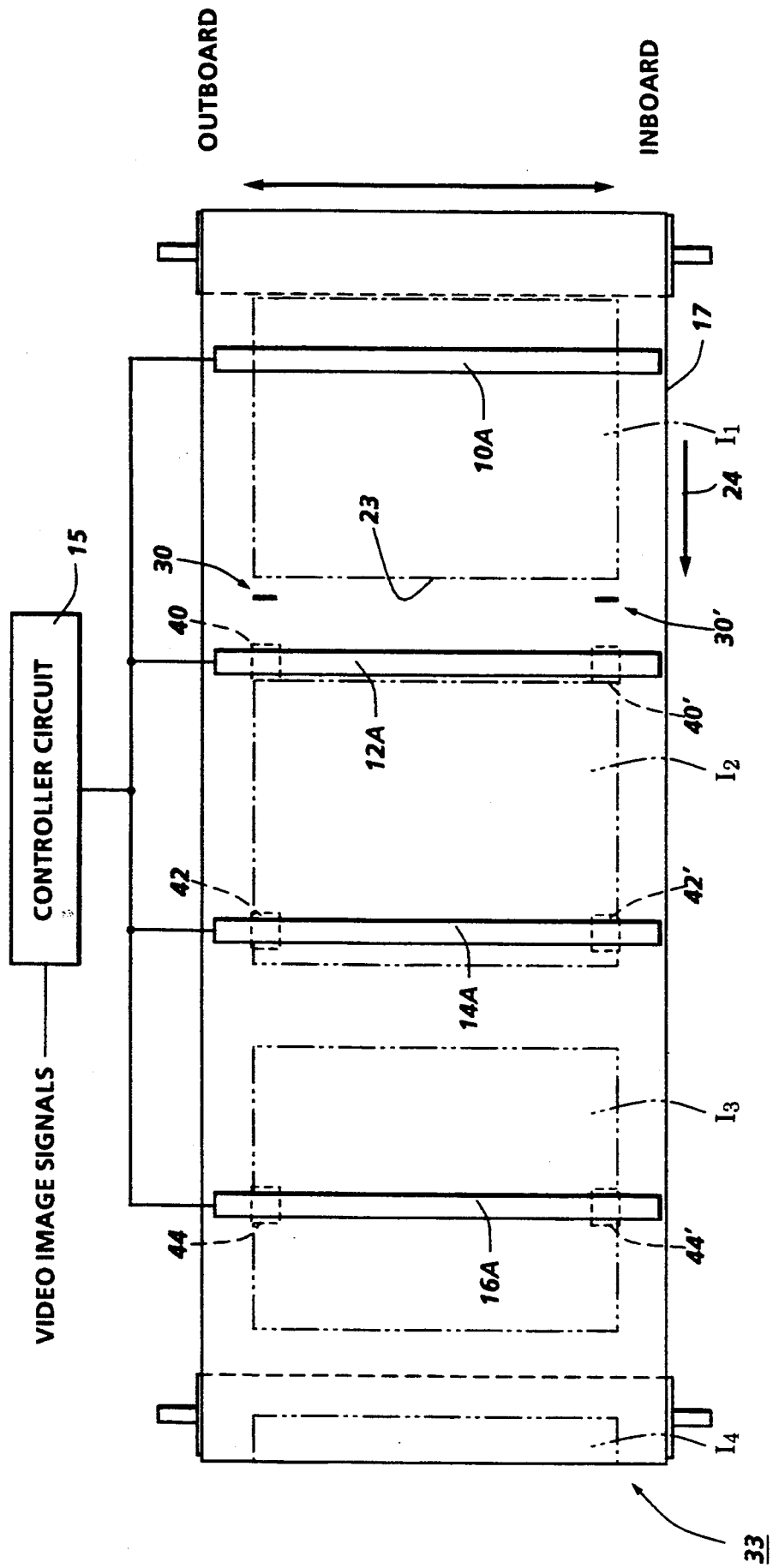
FIGS. 6 shows the system of FIGS. 1 and 2 with two line marks formed at opposite ends of the belt for lateral registration purposes.

While the invention is thus far directed to use of a single mark to enable process direction registration, the invention can also be used in an initial alignment procedure, or in a periodically scheduled realignment procedure, to provide precise process direction registration of the last three print bars used in the system to the first. For this application, a pair of marks 30, 30' would be formed on belt 17, as shown in FIG. 6, by the same process described above. Additional sensors 40', 42', 44' would also be added. FIG. 6 thus reproduces the system of FIG. 2 modified by addition of line mark 30' and the three additional sensors. The marks 30, 30' are again located several scan lines prior to the lead edge of an associated image frame. Again, additional pairs of marks can be formed for each image frame. The outboard and inboard portions of each image bar 12A, 14A, 16A are energized during passage of the two marks and signals generated upon detection of each mark. Thus, for example, sensors 40, 40' will detect the passage of marks 30, 30' respectively. The detection circuitry associated with each sensor 40, 40' will provide precise pulses generated at the center of each detected mark line. These pulses are then sent to a timing/comparison circuit in control circuit 15 where time deviations in sensing the line centers are detected and a correction signal is generated and sent to appropriate mechanisms to adjust the lateral and skew orientation of the print bar to compensate for the misalignment. Co-pending application, U.S. Ser. No. 07/807,931, referenced supra, discloses operation of a timing comparison circuit which compares signals generated by sensors sensing the presence of belt holes and operating stepper motors connected to the print bars to accomplish the adjustment. This procedure can be used for the present invention, but with the more precise positioning enabled by the high precision detector circuitry of the present invention.

Figure 7:
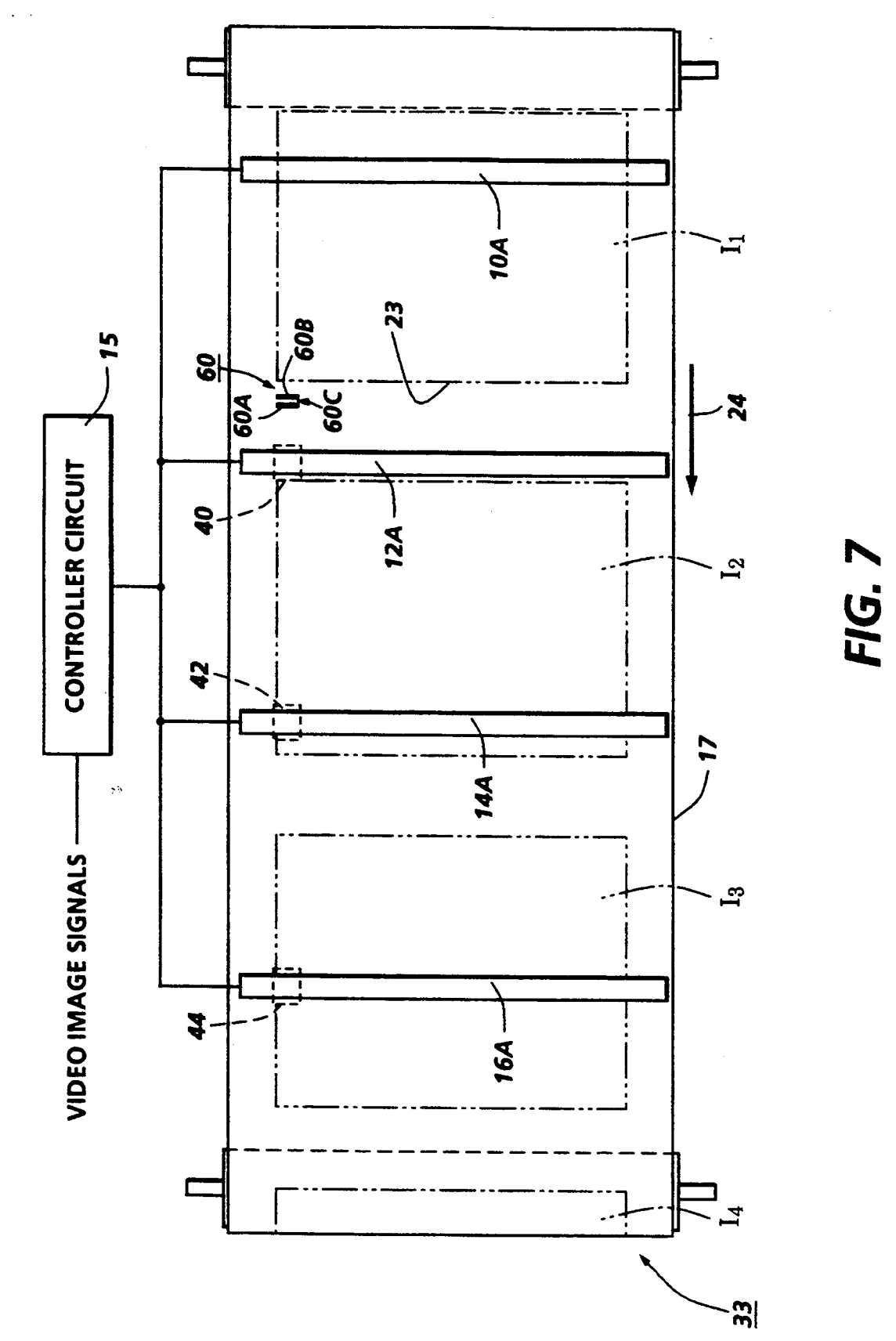

According to a still further embodiment, the invention may be practiced by forming targets other than a single line. FIG. 7 shows a portion of belt 17 from the FIG. 2 embodiment in which a toner mark 60 has been formed by exposure of print bar 10 and developed as previously described. Toner mark 60 comprises two relatively dense segments 60A, 60B with a thin undeveloped space or "line" 60C, about the same width as the target line 30 of FIG. 2. This "line" separates the two sections. For this embodiment, the sensors 40, 42, 44 will detect the center of the "white" line 60C and the signals shown in FIGS. 3B and 4 will be inverted.

In a further variation of the invention, mark 30 (or 60) may be replaced by permanent marks formed on the belt; e.g. not formed by exposure of a print bar and developed with toner. This is less advantageous however, since it would require the use of a fixed pitch on the belt to accommodate different image sizes.

As was mentioned earlier, the imager could be a Raster Output Scanner (ROS). For this embodiment, the ROS systems would operate as disclosed in the aforereferenced Ser. No. 07/807,927 application. The ROS operation would sweep 1-3 scan lines across the width of the line mark as it passes through the line of scan to produce the required exposure over the predetermined time period.

In summary, the detection circuit of the present invention can be used to precisely and repetitively locate the center of a line mark relative to a light source, because, to first order, it is independent of flux level, contamination state of the optical components, gain of the amplifier circuitry, mark line width and photoreceptor belt speed, thus assuring both the sensor to sensor, mark to mark, and within sensor repeatability that is necessary for this high precision registration. Additionally, two marks can be used at opposite sides of the belt to compensate for print bar skew misalignments. Therefore, this sensor can be used to correctly trigger printing of the print bar at each frame location and also to align the print bars prior to printing when two such sensors are employed, one inboard and one outboard. The output signals can thus be used to align the imagers during a setup routine, as well as trigger the writing of subsequent images during the printing as described above. The output of circuit 50 can also be applied to the machine microprocessor which contains software to measure the amplitude of the signal over time and anticipate the need for cleaning of the photosensor 40, or of the imaging components. Appropriate signals can then be generated to either alert an operator to the need for replacement or cleaning, or, alternatively, the imaging light source intensity can be adjusted to compensate for the decreasing sensitivity of the sensor. While the preferred embodiment made use of the pre-existing print bars as the light source, it is understood that a separate light source could be used in a different type of imaging system, the light source suitably controlled through the control circuit.

EXAMPLE OF A SPECIFIC EMBODIMENT

FIG. 5 is a detailed diagram of the circuit used to demonstrate the feasibility of the concept, and it recreates the block diagram of FIG. 4. A 670 nm, 300 spi print bar segment was made operational in a lab fixture and used to optimize the circuit parameters and components prior to test. The sensor 40 was a 2.7 mm×2.7 mm PIN photodiode manufactured by Telefunken GmBH and was chosen for its high speed, small size, availability and overall suitability to the task. The differential stage 54 is an inverting configuration, as that is a little simpler than the non-inverting, and is biased at around 2.3 V by a resistor network, consisting of the 1K, 200 and 1K resistors, to allow for linear operation distant from power supply rails. The output from this stage is applied to the inverting input of comparator 56. The comparator 56 is nominally biased at 2.9 volts by the resistor network tied to the non-inverting input, and thus when no signal is present, its output is at 5 V (=high). When the differential output exceeds 2.9 V, as it does when a mark 30 begins to transit the viewing nip, the comparator output switches to 0 V (=low). The resistor network feeds a fraction of the output back to the non-inverting input and resets the comparator bias to 2.4 V, which is 0.1 volt above the "local zero" of the differentiator. Thus when the differentiator swings quickly from maximum to minimum voltage, the comparator will return to the high state when the differential signal passes through 2.4 V. The 2.4 V triggering level was chosen so that the comparator triggered slightly prior to arrival of the center of the line, at 2.3 V. This was done in order to compensate for op amp slew rates and for internal delays in the comparator IC. If the width of the line mark is chosen to be approximately equal the width of the LED print bar print zone, then this second, low to high, comparator transition marks the point of maximum flux attenuation, which is the center of the line 30.

The sensor 40 and preamp 52 were mounted in the print bar backer bar located beneath a photoreceptor 17 and used to maintain a precise spacing between the photoreceptor and the print bar. Line marks having line widths ranging from 50 to 500$\mu$ were developed with black toner and were passed through the nip formed by the LED print bar and the sensor where they were detected. The signals were stored on a Tektronix 2232 oscilloscope for later analysis.

Figure 8:
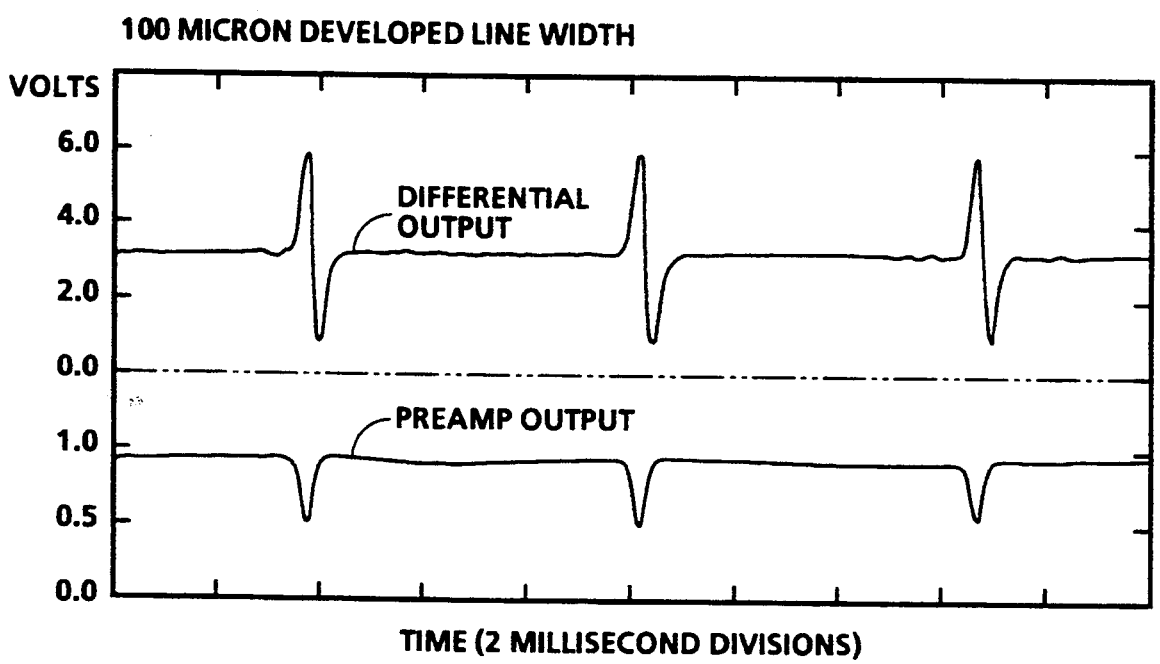
FIGS. 8, 9 and 10 illustrate waveform outputs at points internal to the detection circuitry.
Figure 9:
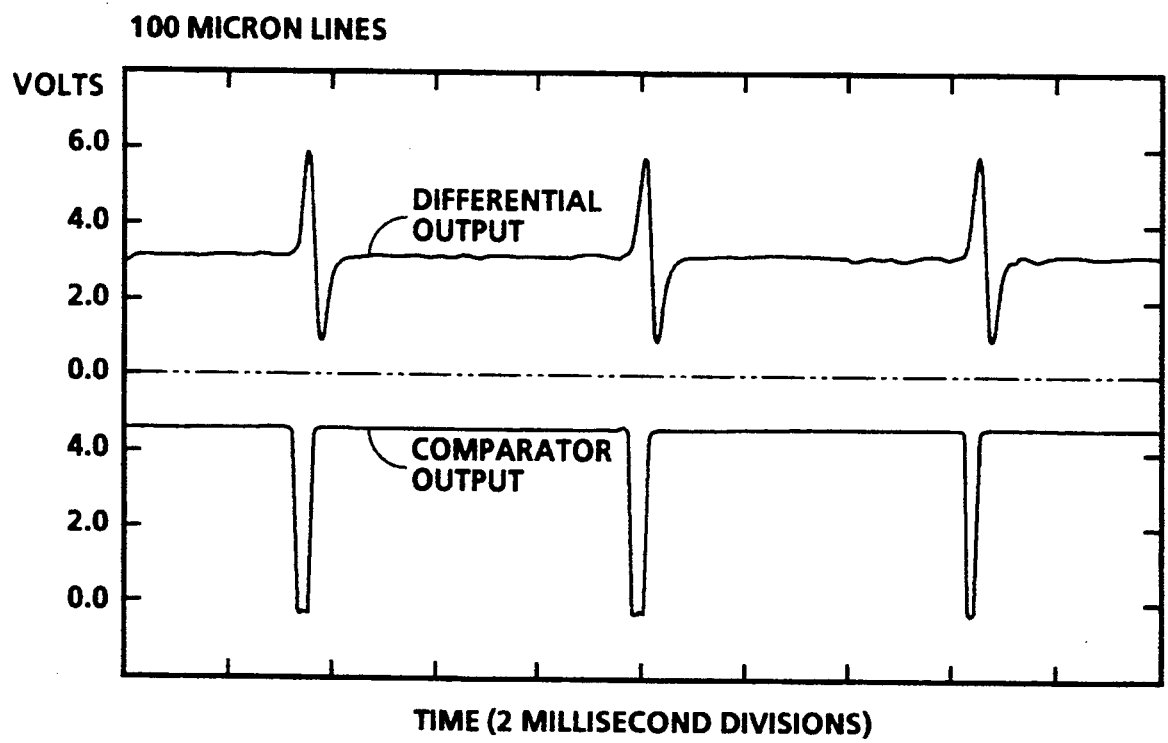
Figure 10:
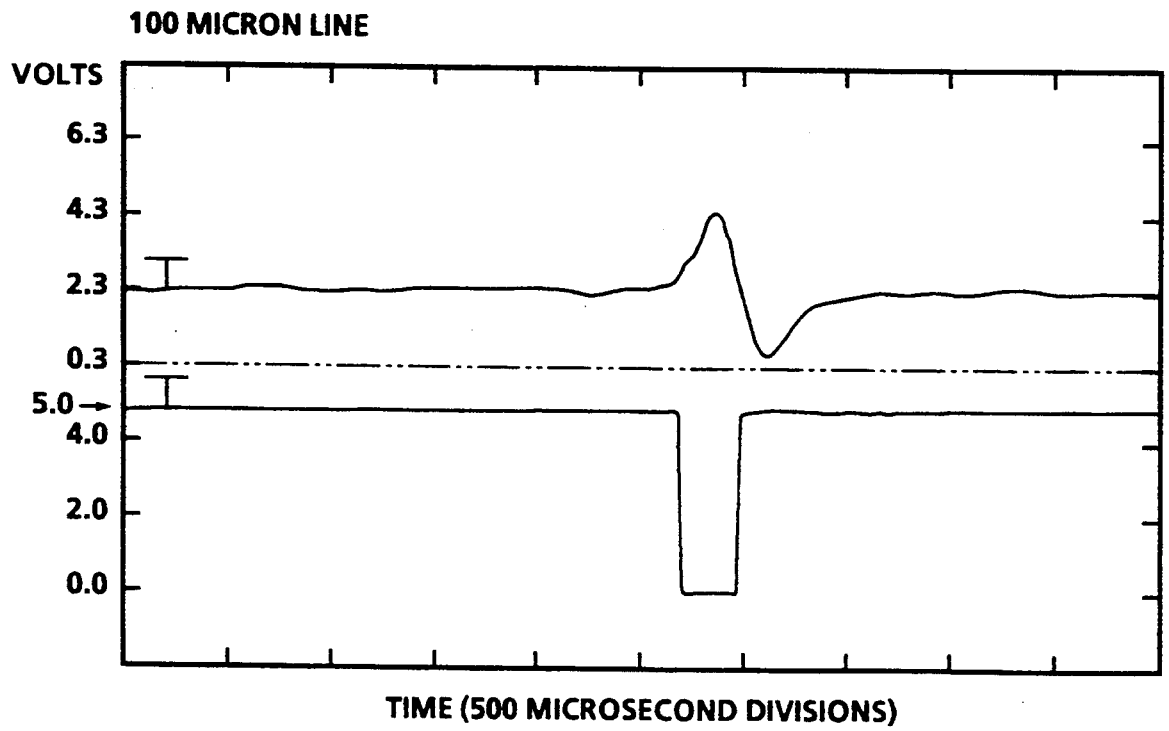

FIG. 8 is a printout of the scope screen with two traces showing the preamp and the differential stage outputs as three 100$\mu$ developed black lines passed through the viewing nip, and FIG. 9 shows the differential and output trigger signals for a similar set of three lines. FIG. 10 shows the same information with the time scale expanded to illustrate details more clearly. The comparator transitions low when the differential signal exceeds 2.9 volts, indicating the arrival of the line, and resets high when that signal passes through 2.4 volts, indicating the arrival of the center of the line. Resolution of the measurement may be estimated from the slew rate and noise signature of the differential signal:

$$R = \pm \text{noise/slew rate}$$

where the noise is in volts and the slew rate is in volts/mm. From FIG. 10, the noise in the differential signal is approximately ±0.07 volts and the slew rate is 47 volts/mm, [(4 V per 0.17 ms)/(0.5 mm per ms)]. Substituting into the preceding expression yields:

$$R = \pm 0.07 \text{ V}/47 \text{ V/mm} = \pm 1.5\mu$$

or well below the required ±5$\mu$.

Figure 11:
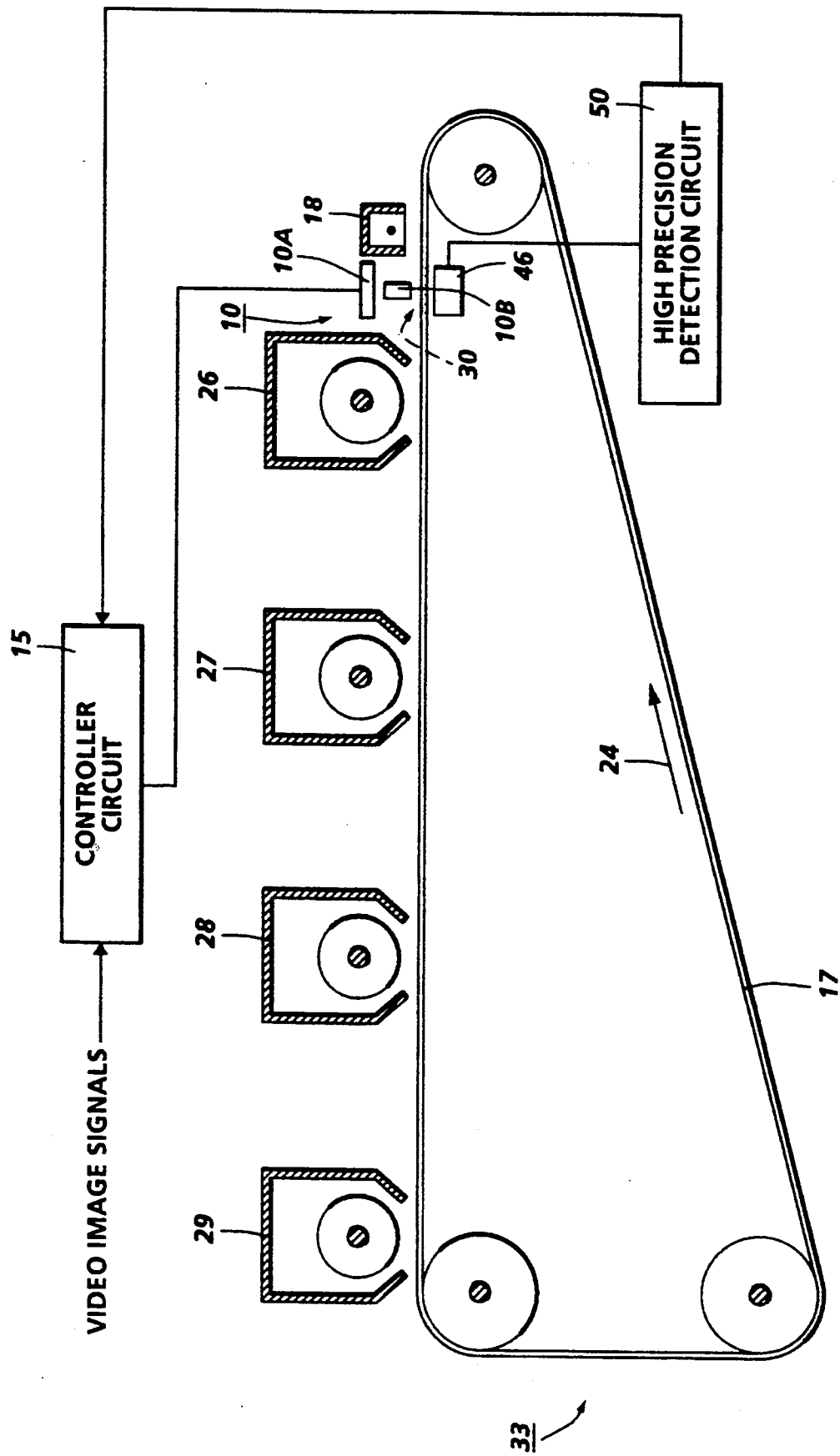
FIG. 11 is a side view of a multiple pass image bar printer incorporating the improved mark detection circuitry of the present invention.

Other modifications of the present invention may occur to those skilled in the art based upon a reading of the present disclosure and these modifications are intended to be included within the scope of the present invention. For example, although the embodiment shown in FIGS. 1 and 2 is a single pass system, the invention would be applicable to a multi-pass system where only one imaging station would form one color image with each revolution of the photoreceptor belt. FIG. 11 represents multi-pass, single LED print bar system which uses some of the components of the FIG. 1 embodiment. A single print bar 10A is addressed by circuit 15 to expose the first image (black) and line mark 30. The image and mark are developed at developer 26 and the belt makes one complete revolution to bring the developed black image under charging station 18 where it is recharged. As line 30 enters the viewing nip between bar 10A and sensor 46, the sensor output is sent to circuit 50 where a write pulse is generated at a predetermined time causing bar 10A to begin exposure of the second color image (yellow) in registration with the first black image. The yellow image is developed by developer 27. The same sequence is repeated for the magenta and cyan images which are developed at developer 28 and 29, respectively. Transfer of the composite image occurs at station 33.

While the invention has been described with reference to the structure disclosed, it will be appreciated that numerous changes and modifications are likely to occur to those skilled in the art, and it is intended to cover all changes and modifications which fall within the true spirit and scope of the invention.

We claim:

1. An electrophotographic printing machine which incorporates a photoreceptor belt which moves along a preselected path,
    imaging means for forming a plurality of registered color images on the surface of said belt, said color images formed in overlying registration to form a composite color image, means for forming at least one target line on the surface of said belt, means for sensing said target line and for generating an output signal representing detection of the center of said target line, and means responsive to said output signal for maintaining the overlying registration of said color images.

2. The printing machine of claim 1 wherein said photoreceptor is semi-transparent and wherein said sensing means comprises:

a light source opposed from one surface of the photoreceptor belt for illuminating the surface and the target line thereon, a light sensitive sensor opposed from the other surface of the photoreceptor for sensing the target line, and wherein said means for generating an output signal include circuit means for amplifying and differentiating the output of said sensor, and comparator means for processing the differentiated output to produce a trigger signal which is generated at the time of detection of the center of the target line.

3. The machine of claim 2 wherein said imaging means includes at least one print bar aligned adjacent to said photoreceptor and perpendicular to said preselected path, said print bar forming one of said color images during each revolution of the belt, said target line being formed a short distance upstream of the image frame in a plane parallel to said print bar and illuminated by said print bar.

4. The machine of claim 3 wherein said imaging means includes a plurality of print bars, each of which form a color image during a single revolution of the belt.

5. The machine of claim 2 wherein said target line is exposed with the first color image exposure and is developed with a toner used to develop this first color image.

6. The machine of claim 1 wherein two target lines are formed separated by a unmarked area of a nominal width of 25 to 150 microns and wherein said circuit means provides a trigger signal when said unmarked area is detected.

7. A method of compensating for photoreceptor belt deviations from a preselected path of movement, comprising the steps of:

forming at least one target line on the photoreceptor belt, sensing the center of the line to detect registration deviations from the preselected path of movement, and adjusting an image processing station adapted to record latent images on the photoconductive belt, in response to said sensing step, to compensate for the detected deviations.

8. A digital color printer for forming multiple color image exposure frames on a photoconductive member including:

a photoreceptor belt movable in a process direction accommodating the formation of multiple image exposure frames, said belt having at least one line mark formed outside of the image exposure area, at least one imager which generates successive scan lines across the photoreceptor surface to produce said exposure frames in response to input video signals, detecting means associated with at least one imager for detecting the center of said line mark, said detecting means generating output signals when said scan lines are attenuated by said line mark as said belt moves in the process direction, and control means for registering said image exposure frames in response to said output signals.

9. The imaging system of claim 8 further including means for adjusting the process direction location of said exposure frames in response to said detecting means output signals.

10. Apparatus for multiple image exposures of an image area on a longitudinally moving belt, said apparatus comprising:

imaging means for projecting scan lines onto said belt to form an image area, means defining a pair of opposed line marks on the belt in a position relative to the image area, means for detecting the process direction positions of the center of said line marks for each of the image exposures, and means for adjusting said imaging means for each of the image exposures in response to detected positions of the center of said line marks so as to assure lateral registration of said image exposures.

11. A method for compensating for misregistration of multiple superimposed images on a photoreceptor belt moving in a process direction comprising the steps of:

forming a first and second line mark in the belt, the line marks located in non-image exposure edge areas of the belt, positioning at least a first and second imager in image forming position with respect to the belt, each said imager forming modulated scan lines on the surface of said belt, moving the belt until the radiation from the beginning and end of said scan line is attenuated by said line marks and detected by photodetecting means positioned beneath said apertures, said photodetector means generating signals operated on by discrimination circuitry to generate a trigger single representing the center of the detected line marks, and rotating the scan line in a process or reverse process direction until said photodetecting means output signals are coincident in time.

12. An electrophotographic printing machine which incorporates a photoreceptor belt which moves along a preselected path, imaging means for forming a plurality of registered color images on the surface of said belt, said color images formed in overlying registration to form a composite color image, means for forming at least one target line on the surface of said belt, means for sensing said target line and for generating an output signal representing detection of the center of said target line, and control means for measuring the amplitude of said output signal over time and for generating an output signal signifying the need for replacing said sensing means.

13. The machine of claim 12 wherein said target line has a nominal width of 25 to 150 microns.

* * * * *